No. 743,665.  
PATENTED NOV. 10, 1903.  
C. L. SCHWARZ.  
SPOKE FOR VEHICLE WHEELS.  
APPLICATION FILED JAN. 6, 1903. RENEWED OCT. 3, 1903.  
NO MODEL.
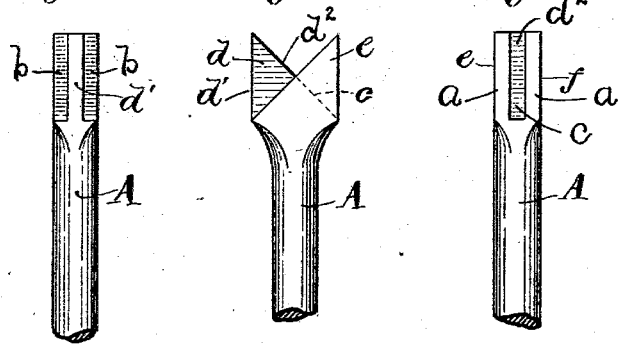
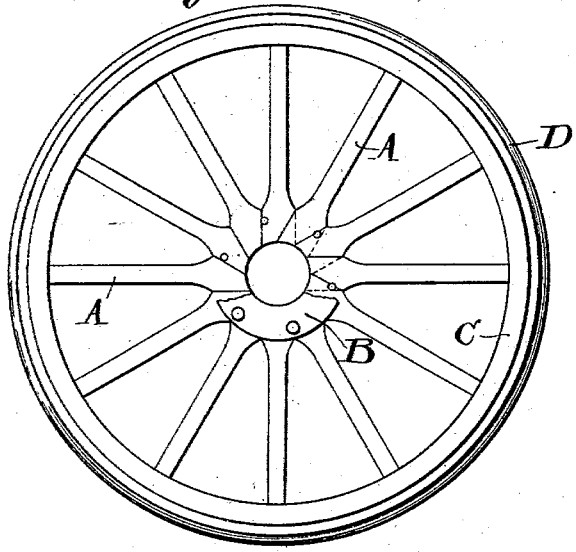
WITNESSES:
INVENTOR No. 743,665.

Patented November 10, 1903.

UNITED STATES PATENT OFFICE.

CHARLES L. SCHWARZ, OF PHILADELPHIA, PENNSYLVANIA.

SPOKE FOR VEHICLE-WHEELS.

SPECIFICATION forming part of Letters Patent No. 743,665, dated November 10, 1903.

Application filed January 6, 1903. Renewed October 3, 1903. Serial No. 175,698. (No model.)

*To all whom it may concern:*

Be it known that I, CHARLES L. SCHWARZ, a citizen of the United States, residing at Philadelphia, county of Philadelphia, and State of Pennsylvania, have invented a new and useful Improvement in Spokes for Vehicles and Methods of Assembling the Same, of which the following is a full, clear, and exact description, reference being had to the accompanying drawings, which form a part of this specification.

The object of my invention is the construction of a spoke which will intermesh with a contiguous spoke, so that the spoke may be assembled in proper position for any-sized wheel and held together in that position independently of the hub or tire. To that end, speaking generally, I form the inner end of each spoke on one side with a mortise-groove and on the other side with a tenon, the outer face of the mortise and the outer face of the tenon being parallel with each other, while the bottom of the mortise is at an angle with its outer face and the tenon has an inclined face forming a prolongation of the inclined bottom of the mortise. The thickness of the tenon is substantially equal to the width of the mortise, the inner face of the mortise being cut away at an angle with the tenon, the angle being such that when the tenon of one spoke is inserted into the mortise of the contiguous spoke the outer face of said mortise will rest against the inner face of the mortise of the spoke whose tenon is thus inserted. By this construction the spokes may be readily assembled in proper relation to each other by inserting a tenon of one spoke in the mortise of the contiguous spoke. The angles of the bottom of the mortise and the inner face of the mortise are varied dependent upon the number of spokes in the wheel. This construction holds the spokes in fixed proper relation with each other and the wheel as a whole. The flange-ring may then be bolted on the faces of the inner ends of the spokes and rim and tire connected to the outer end.

I will first describe the embodiment of my invention illustrated in the accompanying drawings and then point out the invention in the claims.

In the drawings, Figure 1 is a view of my improved spokes assembled in a wheel. Fig. 2 is a view of one edge of end of spoke. Fig. 3 is a side view of same end of spoke. Fig. 4 is a view of edge of same end of spoke opposite to that of Fig 2.

A is the spoke; B, the flange-plate; C, the rim, and D the tire. The outer ends of the spokes are constructed in the ordinary way for the reception of the rim and tire.

The inner ends of the spokes I construct in the following manner: On one side of the inner end of the spoke I construct a mortise having the outer face $a$, the inner inclined face $b$, and the inclined bottom $c$. On the opposite side of the inner end of the spoke I construct a tenon $d$. This tenon $d$ is formed with an outer face $d'$ parallel with the face $a$ of the mortise. $d^2$ is an inclined face of the tenon forming a prolongation of the inclined bottom $c$ of the mortise. This tenon $d$ is at a level below the body of the spoke or of the walls $e f$ of the mortise and is of a thickness substantially equal to the width of the mortise.

The spokes are assembled in the following manner: The tenon of one spoke is inserted through the mortise in the contiguous spoke, so that the face $d'$ of the tenon will rest upon the inclined bottom $c$ of the mortise and the inclined face $d^2$ of the tenon of that spoke, while the inclined face $b$ of the mortise of the inserted spoke will rest against the outer face $a$ of the mortise of the contiguous spoke. This method is carried on until all the spokes around the wheel are assembled. The spokes are thus readily assembled in correct fixed and true position and may be secured by the flange or ring plate B and the rim C and tire D placed in position.

Having now fully described my invention, what I claim, and desire to protect by Letters Patent, is—

1. A new and improved spoke having at its inner end on one side a mortise and on the other a tenon, the mortise having its bottom at an angle with the outer face.

2. A new and improved spoke having at its inner end on one side a mortise and on the other a tenon, the inner and outer faces of said tenon being at an angle to each other.

3. A new and improved spoke having at its inner end on one side a mortise and on the other a tenon, the mortise having its bottom at an angle with the outer face, the outer and inner faces of the tenon being at corresponding angles.

4. A new and improved spoke having at its inner end on one side a mortise and on the other a tenon, the mortise having its bottom at an angle to the outer face, the outer and inner faces of the tenon being correspondingly arranged, the bottom of said mortise forming a prolongation of the inner tenon-face.

5. A new and improved spoke having at its inner end, on one side, a mortise, and on the other a tenon, the outer face of said mortise being parallel with the spoke and the outer face of the tenon being parallel with the spoke.

6. A new and improved spoke having at its inner end on one side a mortise and on the other a tenon, the outer face of said mortise being parallel with the spoke and the outer face of the tenon being parallel with the spoke, the bottom of the mortise and the inner face of the tenon being at like angles with the spoke.

7. A new and improved spoke having at its inner end on one side a mortise and on the other a tenon, the outer face of which is parallel with the outer face of the mortise, the bottom of the mortise being at an angle with the outer face, the tenon having an inclined face forming a prolongation of the inclined bottom of the mortise.

8. A new and improved spoke having at its inner end on one side a mortise and on the other a tenon, the outer face of which is parallel with the outer face of the mortise, the bottom of the mortise being at an angle with the outer face, the tenon having an inclined face forming a prolongation of the inclined bottom of the mortise, the thickness of the tenon being substantially equal to the width of the mortise.

9. A new and improved spoke having at its inner end on one side a mortise and on the other a tenon, the outer face of which is parallel with the outer face of the mortise, the bottom of the mortise being at an angle with the outer face, the tenon having an inclined face forming a prolongation of the inclined bottom of the mortise, the inner face of said mortise being at an angle with the outer face.

10. A new and improved spoke having at its inner end on one side a mortise and on the other a tenon, the outer face of which is parallel with the outer face of the mortise, the bottom of the mortise being at an angle with the outer face, the tenon having an inclined face forming a prolongation of the inclined bottom of the mortise, the thickness of the tenon being substantially equal to the width of the mortise, the inner face of said mortise being at an angle with the outer face, whereby when the tenon of one spoke is inserted into the mortise of the contiguous spoke the outer face of said tenon will rest upon the inclined bottom of the contiguous spoke-mortise and the inclined tenon of said spoke while the inclined inner mortise-face of the inserted spoke will rest against the outer mortise-face of the contiguous spoke.

In testimony of which invention I have hereunto set my hand, at Philadelphia, on this 31st day of December, 1902.

CHARLES L. SCHWARZ.

Witnesses:
M. F. ELLIS,
G. I. HUTTON.